United States Patent
Moreau (10) Patent No.: US 7,624,537 B2
(45) Date of Patent: Dec. 1, 2009

(54) DOOR OF A MOTOR VEHICLE WITH A SLIDING GLASS PANEL, AND UPPER KIT FOR DOOR, CORRESPONDING METHOD OF MANUFACTURING AND VEHICLE

(75) Inventor: Stephane Moreau, Le Puy Saint Bonnet (FR)

(73) Assignee: Wagon Automotive SNC, Bressuire (FR)

( * ) Notice: Subject to any disclaimer, the term of this patent is extended or adjusted under 35 U.S.C. 154(b) by 0 days.

(21) Appl. No.: 10/719,977

(22) Filed: Nov. 21, 2003

(65) Prior Publication Data

US 2004/0150248 A1 Aug. 5, 2004

(30) Foreign Application Priority Data

| Nov. 21, 2002 | (FR) | .................................. 02 14611 |
| Nov. 21, 2002 | (FR) | .................................. 02 14612 |
| Nov. 29, 2002 | (FR) | .................................. 02 15107 |
| Apr. 16, 2003 | (FR) | .................................. 03 04795 |

(51) Int. Cl.
    *E05D 15/00* (2006.01)
(52) U.S. Cl. .............................. 49/212; 49/349; 49/352; 49/502
(58) Field of Classification Search .................... 49/348, 49/349, 212, 352, 502
    See application file for complete search history.

(56) References Cited

U.S. PATENT DOCUMENTS

| 2,648,087 A | | 8/1953 | Kiker, Jr. ....................... 15/254 |
| 2,944,276 A | | 7/1960 | Presser .................... 15/250.24 |
| 3,354,494 A | | 11/1967 | Rischman ................ 15/250.24 |
| 4,240,227 A | * | 12/1980 | Hasler et al. ................... 49/348 |
| 4,604,830 A | * | 8/1986 | Maeda et al. ................ 49/374 |
| 4,608,779 A | * | 9/1986 | Maeda et al. ................. 49/374 |
| 4,653,230 A | * | 3/1987 | Seo et al. ....................... 49/502 |
| 4,788,794 A | | 12/1988 | Miller .......................... 49/214 |
| 4,823,511 A | * | 4/1989 | Herliczek et al. ............. 49/404 |
| 4,932,161 A | * | 6/1990 | Keys et al. .................. 49/490.1 |
| 5,086,586 A | | 2/1992 | Hlavaty et al. ................ 49/211 |
| 5,086,589 A | * | 2/1992 | dibenedetto ................... 49/502 |
| 6,141,910 A | * | 11/2000 | Kobrehel et al. .............. 49/378 |
| 6,161,337 A | * | 12/2000 | Morando ...................... 49/352 |

(Continued)

FOREIGN PATENT DOCUMENTS

DE    19820478    11/1999

(Continued)

*Primary Examiner*—Jerry Redman
(74) *Attorney, Agent, or Firm*—David C. Bohn; Westman, Champlin & Kelly, P.A.

(57) ABSTRACT

Door of a motor vehicle comprising a body shell and at least one movable glass panel, likely to slide at least partially on the inside of the shell between a sealing position and at least one open position, characterized in that it comprises at least one strut bearing a watertight joint against which the side of the movable glass panel turned towards the inside of the vehicle leans, in the sealing position, and in that each of the struts bears at least one guide track allowing to slightly distance the movable glass panel from the watertight joint, in a sliding position in which the movable panel can slide without damaging the watertight joint, and to return the movable glass panel and the watertight joint to lean against each other, in the sealing position.

34 Claims, 9 Drawing Sheets

U.S. PATENT DOCUMENTS 6,425,208 B1 * 7/2002 Klueger et al. ................. 49/502
6,536,832 B1 * 3/2003 Grimm et al. ............ 296/146.6

FOREIGN PATENT DOCUMENTS

| EP | 0479522 | 4/1992 |
| EP | 0604033 | 6/1994 |
| EP | 0739770 | 10/1996 |
| EP | 1040948 | 10/2000 |

* cited by examiner

Fig. 16

DOOR OF A MOTOR VEHICLE WITH A SLIDING GLASS PANEL, AND UPPER KIT FOR DOOR, CORRESPONDING METHOD OF MANUFACTURING AND VEHICLE

FOREIGN PRIORITY DATA

The present application claims foreign priority from French Applications FR 02-14611 filed Nov. 21, 2002, FR 02-14612 filed Nov. 21, 2002, FR 02-15107 filed Nov. 29, 2002, and FR 03-04795 filed Apr. 16, 2003, the contents of which are incorporated by reference in their entireties.

FIELD OF THE INVENTION

The field of the invention is that of the making of openings in vehicle doors. More precisely, the invention relates to the sealing devices of an opening made in the door of a motor vehicle and comprising a movable part according to an essentially vertical direction, likely to close or free an opening.

BACKGROUND OF THE INVENTION

The invention particularly applies to side doors of a motor vehicle, and can also apply to back doors or to rear hatches.

Classically, to seal the opening of a vehicle, whether that be a car, a commercial vehicle, a lorry, a bus or a train carriage, a window is fitted, held in place by a frame. The latter has an internal part and an external part, which simultaneously press against the edges of the window, with sealing trimmings.

The most commonly known technique for opening and closing windows is to render the latter vertically movable within its own plane, in making it enter or exit its shell or its side door trimmings.

Today, this technique is much used and automation solutions are known. The fitting of cars with electric windows is now commonplace.

At the same time, another technique was proposed by the Assignee of the present application. This technique is notably described in the documents of patents EP-0 778 168 and EP-0 857 844.

Thanks to this technique, "flush openings" are achieved which have, aesthetically speaking, as seen from the outside, a smooth aspect, being flush as no frame is needed.

According to the prior technique proposed by the Assignee, the "flush openings" comprise a fixed unit and a movable part, the fixed unit being intended to be fitted into the especially designed well on the body of the vehicle.

Now, the openings made in the doors have relatively restricted dimensions so it is not appropriate to greatly reduce them in introducing a fixed unit according to the prior technique.

Nevertheless, it is desirable to be able to fit certain vehicles, in particular top-of-the-range vehicles such as people carriers, with flush openings, the prior flush openings not being modifiable to doors of such vehicles.

The present invention proposes a solution that allows the closing of an opening made in the door of a vehicle with a flush panel fitted with a vertically movable part for ventilation purposes.

The invention also has the objective of supplying such a sealing device which allows to resolve the particular problems associated with the structure of a door.

Furthermore, another objective of the invention is to supply such a sealing device to ensure the watertightness in a reliable and durable manner.

The invention also has the objective of supplying such a sealing device which avoids the introduction of harmful and undesirable particles between the movable panel and the means of associated watertightness.

The invention also has the objective of supplying such a sealing device which allows the making of doors which have new characteristics, notably in terms of aesthetics and ergonomics.

Another objective of the invention is to supply such a sealing device which is of simple design and easy to implement.

The invention has yet another objective, according to certain embodiments, of supplying such a door which allows simple integration and aesthetics of a concealing device, securing of the sealing device against possible attempted intrusions, etc.

Yet another objective of the invention is to supply a method of manufacturing the door of a motor vehicle, that is simple and quick to implement.

SUMMARY OF THE INVENTION

These objectives along with others, which will be described later, are achieved thanks to the invention whose object is the door of a motor vehicle, comprising a body shell and at least one movable glass panel, likely to slide at least partially on the inside of the shell between a sealing position and at least one open position, the door comprising at least one strut bearing a watertight seal against which the side of the movable glass panel, turned towards the inside of the vehicle comes to have contact with the watertight seal, in the sealing position, each of the struts bearing at least one guide track allowing to slightly distance the movable glass panel from the watertight seal, in a sliding position in which the movable panel can slide without damaging the watertight seal, and to return the movable glass panel and the watertight seal to have contact with each other, in the sealing position.

The watertightness of the device is ensured when the movable panel is in the sealing position, whilst avoiding, or at least limiting, the harmful or undesirable effects due to the interaction between the movable panel and watertight seal.

Indeed, by distancing the movable panel from the joint while the panel slides vertically, the invention avoids:

premature wear and tear of the watertight seal likely to be produced by the successive rubbing of the panel against the joint, noise (such as squeaking), once again due to the rubbing of the panel against the joint, such noises can increase with the structural adjustments to the joint due to variations in temperature, humidity or due to sun rays, wear and tear, etc.

The use of tracks allows this function to be ensured in a simple and efficient manner.

According to an advantageous solution, in the sliding position, the glass panel is in a sliding plane parallel to a sealing plane occupied by the glass panel in the sealing position.

According to a preferred solution, each of the struts bears at least two guide tracks, respectively next to the upper and lower parts of the strut.

According to an advantageous solution, at least one of the struts enters into the shell.

Preferably, the strut(s) are designed so as only to come into contact with the side of the movable glass panel turned towards the inside of the vehicle, so as to have a flush aspect in the sealing position.

Thus a door is obtained comprising a window sliding in a vertical direction and that has a flush aspect as well as an aerodynamic aspect, compatible with the other "flush openings" proposed by the present Assignee.

Advantageously, the struts are connected at their upper parts by a cross member, to create an interior frame, the watertight seal substantially extending along the entire length of the frame.

Thus, the invention supplies a sealing device according to which it has not been planned to fit a fixed unit defining a sliding plane for the movable panel as is the case with the prior technique.

On the contrary, the device exploits the strut(s) or the frame, classically present on a door, as a means of support for the panel when the latter is in the sealing position. In other words, in the sealing position, the movable panel positions itself in front by leaning against the strut(s) or the frame, the joint ensuring the watertightness of the thus created sealing device.

Furthermore, the invention allows the suppression of the frame moldings classically added to the side doors.

According to an advantageous solution, the movable panel is mounted to at least one foot whose displacement is guided via a guide rail and the guide track(s).

Advantageously, the door comprises a motorized means of driving the movable panel, ensuring the sliding.

According to another embodiment, the means of driving can be manual.

According to a first variant, the means of driving are mounted into a single rail fitted to the inside of the shell, and/or into at least one of the struts.

In this case and according to a first approach, the means of driving advantageously act on at least one of the feet.

According to another characteristic, the door further comprises at least one fixed panel, fitted into the sealing plane.

According to a particular embodiment, the door comprises at least a windscreen wiper blade intended to be moved across the panel in the sealing position, means of guiding being planned for on the strut(s) so as to allow for linear movement of the blades.

According to another advantageous aspect of the invention, the door can support a blind.

In this manner, the fitting ranges are considerably simplified, and the adjustments necessary for the correct operating of the blind are, at least to a large extent, avoided in comparison with classical blinds fitted to a trimming, itself fitted to the structure of the door.

According to a preferred solution, at least one of the struts has means of guiding the sliding of the pull bar of the blind.

According to another characteristic, the door comprises burglarproof means acting upon the movable panel in the sealing position.

In this case, the burglarproof means preferably comprise at least a lock intended to operate with a complementarily shaped housing set into one of the struts or into the frame, with the aim of providing a burglarproof position of the panel in the sealing position, according to which the panel can not be pulled towards the exterior of the vehicle.

According to an advantageous solution, the lock(s) are designed to slot into a part that protrudes the struts or the frame.

According to yet another characteristic, the door comprises means of adjusting the sealing position of the movable panel and/or of the burglarproof means.

Thus, the position of the movable panel can be quickly and easily adjusted in relation to its surroundings (frame, body, rear quarter light, etc.).

In this case, the means of adjusting are advantageously supported by the movable panel or by an integral part of the latter, and are intended to operate with the frame so as to adjust the sealing position of the movable panel.

According to a preferred solution, the means of adjusting comprise two screws, acting on the sealing position along the width of the movable panel, the other acting on the sealing position along the height of the movable panel.

According to an advantageous solution, the strut(s) and/or the cross member are made via extrusion.

Thus, the struts can be designed and made so that they integrate all the operating parts allowing the implementation of the aforementioned characteristics.

The invention also relates to an upper unit of the door of a motor vehicle, creating a kit ready to be mounted to a lower shell of the door of a motor vehicle, and comprising at least one movable glass panel, likely to slide at least partially on the inside of the shell between a sealing position and at least one open position, the door comprises at least one strut bearing a watertight seal against which the side of the movable glass panel turned towards the inside of the vehicle leans, in the sealing position, each of the struts bearing at least one guide track allowing to slightly distance the movable glass panel from the watertight seal, in a sliding position in which the movable panel can slide without damaging the watertight seal, and to return the movable glass panel and the watertight seal to lean against each other, in the sealing position.

According to an advantageous solution, this upper unit comprises means of stiffening.

In this case, the means of stiffening preferably comprise at least one lower cross member linking the lower part to the struts.

Advantageously, the lower cross member has means of implementation and/or support of the struts.

Preferably, the means of implementation and/or support comprise at least one coupling fitted onto one of the ends of the lower cross member and intended to create a housing for one of the struts.

Advantageously, the guide rails have at least one mounting bracket on the strut and/or the cross member.

The assembling of the upper unit which has just been described can be obtained in a particularly simple and efficient manner: the struts are fixed to the cross member, then the guide rails are fixed to the struts. As this will be seen later, there remains the interlocking of the movable glass panel with the driving feet, for example via simple clips. Such an assembly on a production line is largely simplified compared to classical assembly of traditional doors.

Such a layout is also particularly advantageous during future maintenance work, the disassembling of the unit can be obtained by carrying out a limited number of simple actions in the reverse order of assembly.

According to another characteristic, this upper unit comprises means of motorization.

In this case, the means of motorization are preferably fitted to the cross member, and advantageously comprise:
 at least one gear motor;
 at least one coil coupled to the gear motor;
 at least one multi-stranded cable;
 at least one protective sheath of the cable(s);
 means of placing under tension the cable(s).

Of course, other embodiments are conceivable whilst remaining in the scope of the invention, notably in planning for means of motorization implementing rack type cables.

The assembling (or pre-assembling) of the means of motorization with the cross member allow to conceive the manufacturing and assembly (on the cross member) of the means of motorization in a manner independent of the door, even independent of the entire upper unit. The making of this part comprising the means of motorization can consequently be subcontracted and delivered in a ready-to-be-assembled state.

Preferably, the upper unit also comprises means of motorization.

According to a preferred solution, at least one of the struts has an extension intended to enter into the shell so as to allow the interlocking of the shell with the unit.

Advantageously, the upper unit has a blind.

Thus, a complete upper unit is delivered, pre-equipped and set (integrating the opening, the means of motorization, a blind, means of watertightness, etc.), which considerably reduces the problems notably connected with the logistic and/or separate delivery of all the units in question.

The invention also relates to a motor vehicle fitted with an aforementioned door.

The invention yet again relates to a method of manufacturing the door of a motor vehicle, characterized in that it comprises the following stages:

manufacture of a lower shell of the door;

assembly of an upper unit of the door as previously described;

assembly of the lower shell and of the upper unit.

In this way, the different means comprising the upper unit can be assembled and pre-set before being fixed to the shell of the door.

The assembly of the upper unit to the shell is a simple operation: the method of manufacturing a door according to the invention therefore allows a motor vehicle constructor to save considerable time saving, the latter only having to make the shell and carry out the assembly with the pre-set unit, ready for use.

Preferably, the manufacturing stage of the upper unit comprises a shaping stage of at least one of the struts so as to fit to it means of guiding, implementation and/or maintenance of the struts in the shell.

According to an advantageous solution, the manufacturing stage of the upper unit comprises an assembly stage, to the strut(s), of a watertight seal against which the side of the movable glass panel, turned towards the inside of the vehicle, comes to have contact with the watertight seal in the sealing position, and an assembly stage of means for slightly distancing the movable glass panel from the watertight seal one from the other, in a sliding position in which the movable panel can slide without damaging the watertight seal, and for returning the movable glass panel and the watertight seal to have contact with each other, in the sealing position.

BRIEF DESCRIPTION OF THE DRAWINGS

Other characteristics and advantages of the invention will become clearer upon reading the following description of a preferred embodiment of the invention, given by way of non-restrictive examples and made in reference to the annexed figures in which.

DETAILED DESCRIPTION OF THE PREFERRED EMBODIMENTS

Figure 1:
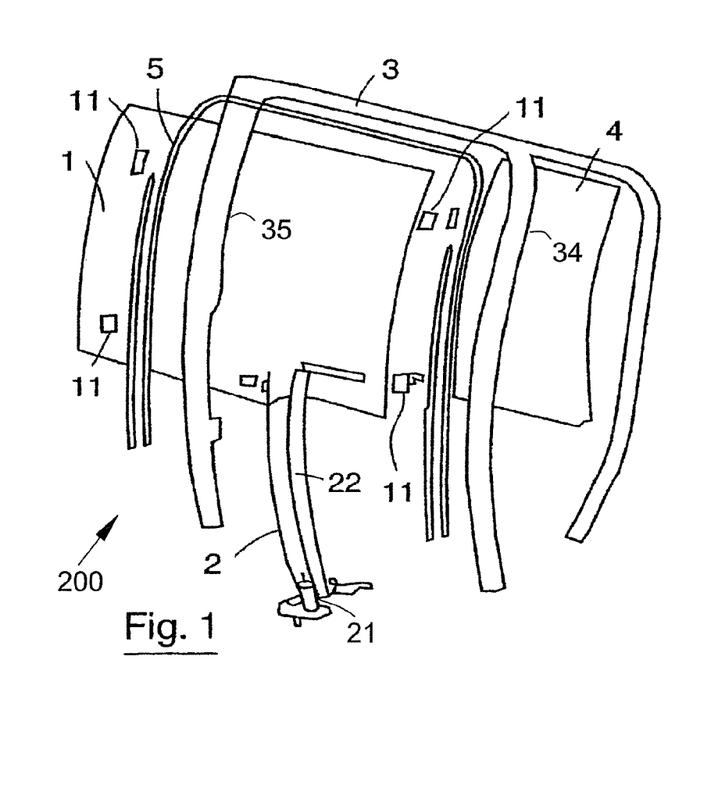
FIG. 1 is an exploded view of a door according to the invention.

In reference to FIG. 1, a side door 200 comprises, according to this embodiment of the invention:

a panel 1 movable according to an essentially vertical direction along the central rail 22, driven between a sealing position 202 (FIG. 3) and an open position 204 (FIG. 3a) via means of motorized driving (of type push-pull cable for example) comprising a gear motor 21;

means of guiding (explained in greater detail later on) provided in struts 34, 35 of a frame 3 and intended to cooperate with the sliding feet 11 supported by the movable panel 1.

Figure 3:
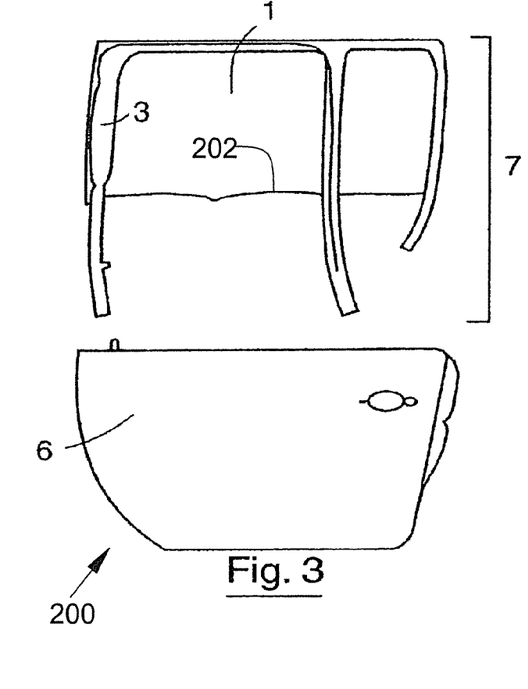
FIG. 3 is a view of an upper unit intended to be fitted to the shell of the door.
Figure 3A:
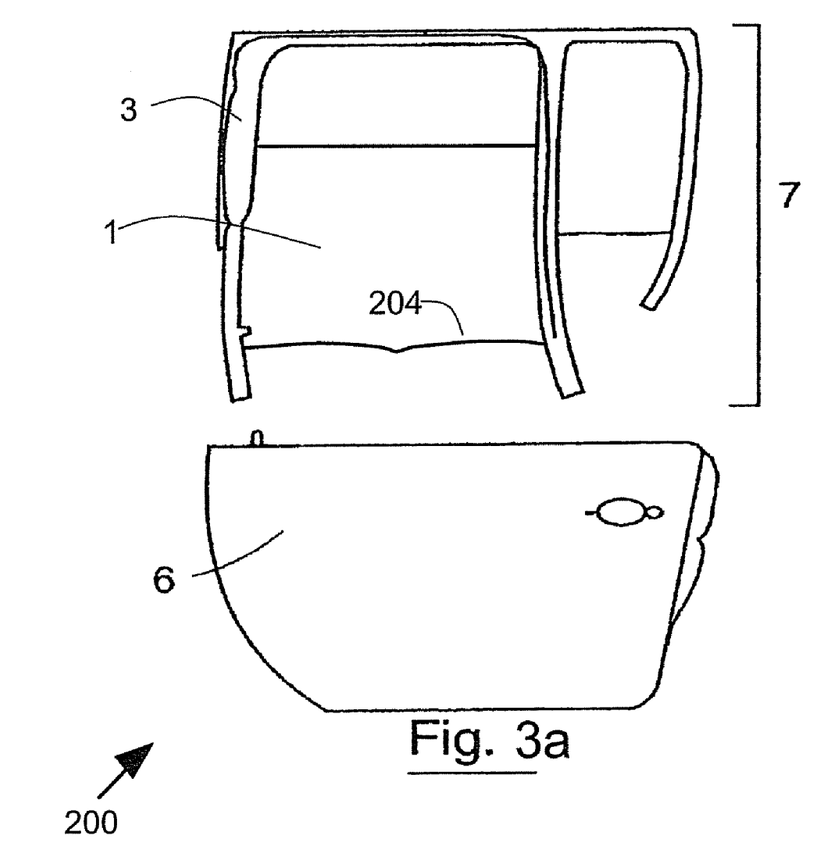
FIG. 3a is a view of an upper unit intended to be fitted to the shell of the door with the movable glass panel in the sliding position.

According to the object of the invention, the frame 3 is added and fixed to a body shell 6 (FIG. 3) of the side door 200 of a vehicle, as illustrated in FIG. 3.

According to this embodiment, the frame 3 is provided to support a fixed rear quarter light window 4, independent of the sealing device according to the invention. The fixed rear quarter light window 4 and, consequently, the corresponding part of the frame 3 are entirely optional.

Advantageously, the rear quarter light window 4 shares one of the struts 34 of the frame 3 with the movable panel 1, and is mounted so as to present a flush aspect, the same as that of the movable panel 1.

According to a characteristic of the invention, a watertight seal 5 is added to the frame 3 so as to extend along the entire length of the visible part of the frame 3 once it has been assembled with the body shell 6 of the door 200.

Figure 9A:
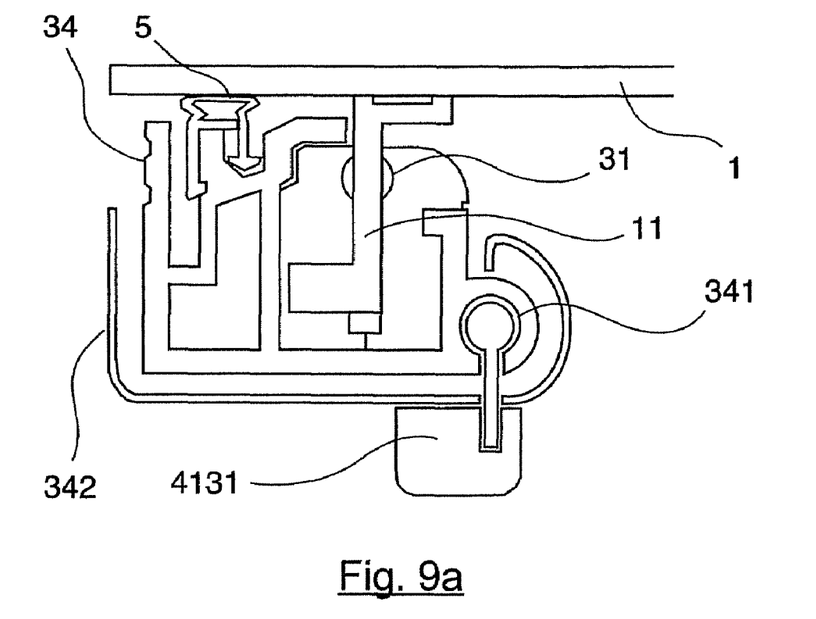
FIG. 9a is a view of the panel in the sealing position.

In the sealing position 202 (corresponding with FIGS. 2, 2a), the movable panel 1 comes to be supported against this watertight seal 5 slightly flattening it so as to provide an airtight seal on the device notably in relation to humidity and drafts, as illustrated in FIG. 9a.

Figure 2:
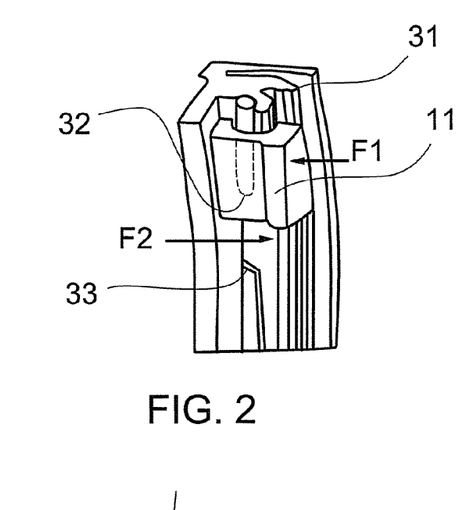
FIG. 2 is a detailed view of the means of guiding a sealing device according to the invention.

As illustrated by FIG. 2, the feet 11 supported by the movable panel 1 are intended to slide on the rails 31 fitted to the struts 34, 35 of the frame 3.

According to the invention, the door 200 comprises means of slightly distancing the movable glass panel 1 and the watertight seal 5 one from the other, in a sliding position 204, that is illustrated on FIGS. 2b and 2c, 3a and 9b, into which the movable panel 1 can slide without damaging the watertight seal 5, and of returning the movable glass panel 1 and the watertight seal 5 to be supported against each other, in a sealing position 202 that is illustrated on FIGS. 2 and 2a, 3 and 9a.

According to this embodiment, these means are comprised of locking/unlocking displacement guide tracks 32 and 33, and intended to cooperate with the feet 11.

The movable panel 1 bears, next to each of its vertical edges, two feet 11, one next to the upper edge, and the other next to the lower edge. At the same time, two pairs of tracks 32 and 33 (respectively acting on the lowering and raising) are provided for each strut 34, 35 of the frame 3, one pair next to the upper end of the corresponding strut 34, 35, and the other next to its lower end.

Figure 2A:
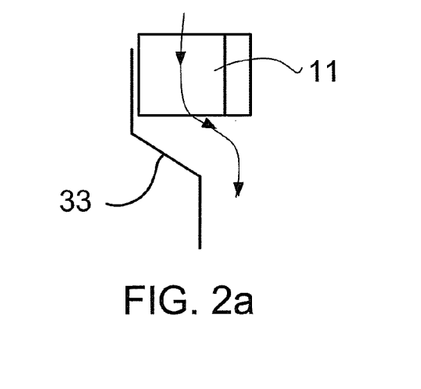
FIG. 2a is a skeletal representation of the means of guiding a sealing device in a sealing position according to the invention.

Thus, whilst lowering (starting from a sealing position 202 (FIG. 3a) that is illustrated on FIGS. 2 and 2a) the movable panel 1, the lower edge of the feet 11 slide along the upper edge of the guide track 33, which produces a gap from the movable panel 1 in the direction indicated by the arrow F2 in FIG. 2. This displacement is also skeletally illustrated in FIG. 2a.

The movable panel 1 can then be lowered to a position limited by a stopper.

Figure 2B:
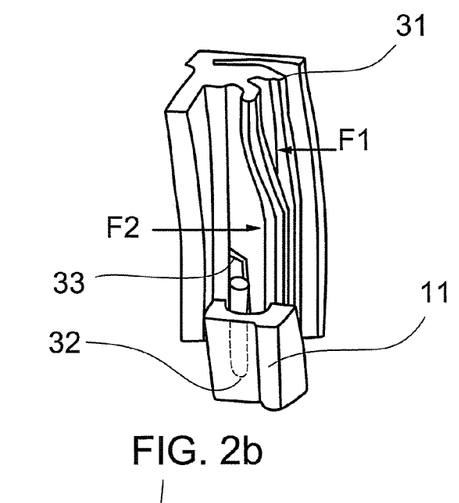
FIG. 2b is a detailed view of the means of guiding a sealing device in a sliding position according to the invention that are moved in a sliding position.
Figure 2C:
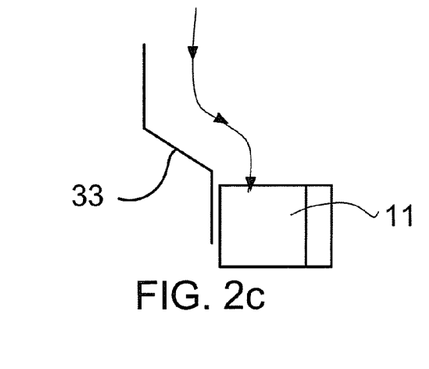
FIG. 2c is a skeletal representation of the means of guiding a sealing device according to the invention that are moved into a sliding position.

Inversely, during a raising of the movable panel 1 from the sliding position 204 (FIG. 3a) illustrated on FIGS. 2b and 2c (the upper edge of the latter approximately reached the upper edge of the frame 3), the upper edge of the feet 11 slide along the lower edge of the guide tracks 32, which produces a displacement of the movable panel 1 in the direction indicated by the arrow F1 back to the sealing position as shown on FIGS. 2 and 2b.

The highest position of the movable panel 1 is moreover limited by a mechanical stopper.

Figure 9B:
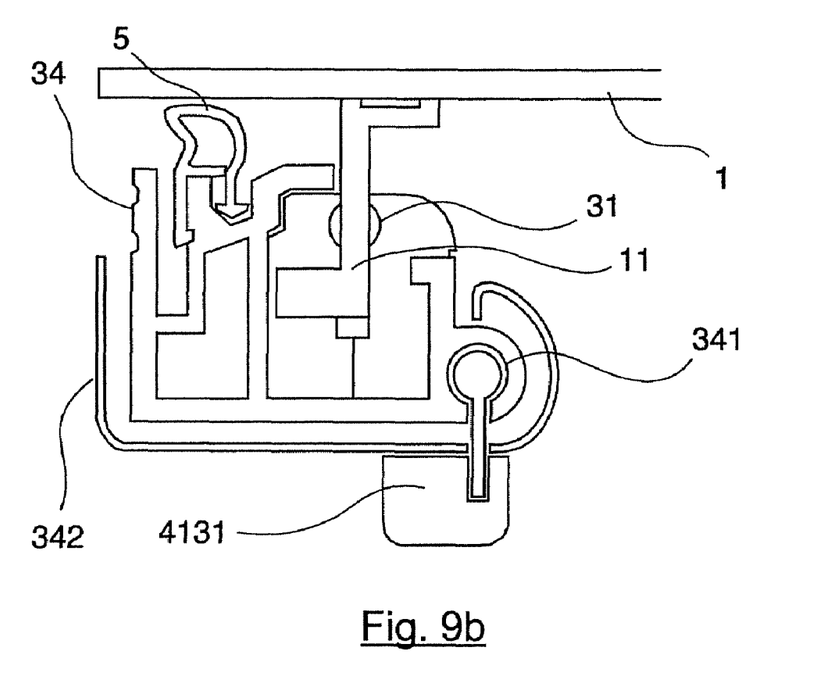
FIG. 9b is a view of the panel in the open position.

The displacement in the direction indicated by the arrow F1 is planned so that the movable panel 1 comes to be supported against the watertight seal 5 to ensure a tight seal, as indicated in FIG. 9a, the direction indicated by the arrow F2 being planned so as to sufficiently distance the movable panel 1 from the watertight seal 5, until they are in a non-contact position, as indicated in FIG. 9b.

The presence of pairs of feet 11 such as previously indicated and corresponding means of guiding, at the top and bottom of the struts 34, 35 of the frame 3, ensure a locking/unlocking displacement of the movable glass panel 1 according to which the latter permanently remains substantially parallel to itself.

Furthermore, according to this embodiment, the movable glass panel 1 is a tinted window allowing to hide, in the sealing position 202, the frame 3 and the watertight seal 5.

According to an advantageous characteristic of the invention, the sealing device can be fitted to a unit 7 (FIG. 3) ready to be assembled to a body shell 6 of the door 200 classically comprising an exterior panel, backing, different means of reinforcement and opening/closing systems.

Such a unit 7 comprises:
a frame 3 of which at least one of the struts 34, 35 comprises means of guiding such as previously described;

a movable panel 1 bearing feet 11 intended to cooperate with the means of guiding of the frame 3.

This unit could in addition be pre-equipped with means of motorization.

These means of motorization can be of the aforementioned type (central rail 22 and motor 21).

According to another conceivable embodiment, the unit 7 can be equipped with means of motorization also comprised of a gear motor 21 and a push-pull cable driving system, the driving system being linked to the feet 11 supported by the movable panel 1. In this case, the driving means extend into the struts 34, 35 of the frame 3.

This second embodiment consequently allows the removal of the central rail 22, the assembly of the unit 7 to the body shell 6 thus being easier than in the case of the first embodiment.

According to yet another embodiment illustrated in FIGS. 4 and 5, the upper unit 7 (FIG. 3) is comprised of a frame 3, a movable glass panel 1, a watertight seal 5 and a lower part 71 which will be described in fuller detail later on in connection with FIG. 15.

Figure 15:
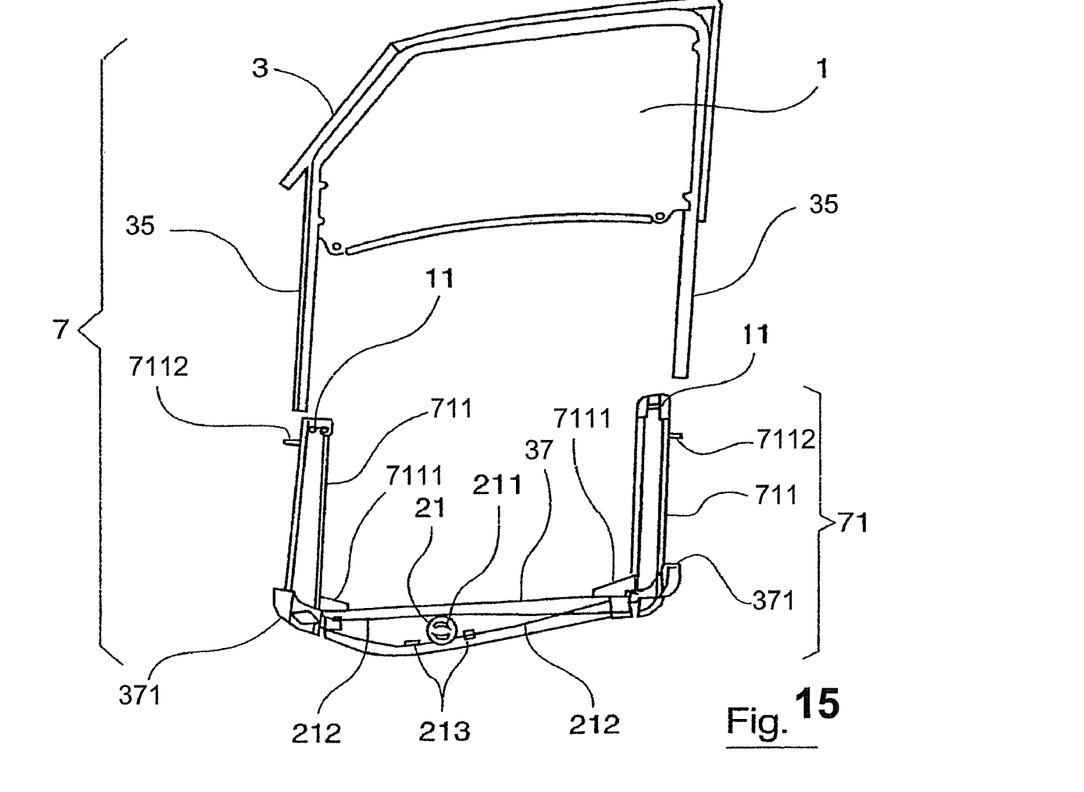
FIGS. 15 and 16 are views of a preferred embodiment of an upper unit intended to be added to a shell of the door, this unit being respectively in a disassembled state and in an assembled state.

According to this embodiment in FIG. 15, this lower part 71 of the unit 7 comprises two guide rails 711 mounted onto the ends of one cross member 37 via mounting brackets 7111.

Figure 16:
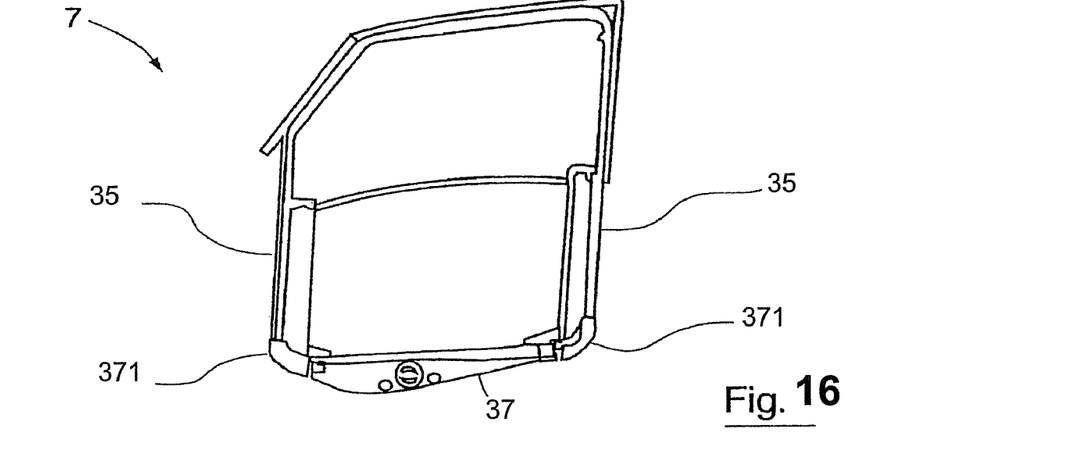

As indicated in FIGS. 15 and 16, the cross member 37 has at each of its ends a coupling 371 creating a housing for a strut 35 of the frame 3. FIG. 15 illustrates an upper unit 7 in an assembled state and in which the struts 35 of the frame are slotted into the couplings 371 of the cross member 37, the rails 711 being in addition fixed to the struts 35 via mounting brackets 7112.

Lower part 71 exercises a stiffening function on the upper unit 7. Indeed the cross member 37 links the struts 35 at their lower ends, this connection being furthermore strengthened by the rails 711 fixed (before assembling the lower part 71 of the frame 3) to the cross member 37 on one hand and to the struts 35 on the other hand, as illustrated in FIG. 15.

According to another characteristic, the cross member 37 has means of motorization comprising:
a gear motor 21;
a coil 211 coupled to the gear motor 21;
multi-stranded cables 212 connecting the coil 211 to the feet 11;
protective sheaths (not represented) of the cables 212;
means of placing the cables 212 under tension 213 (known to those skilled in the art).

The driving via the multi-stranded cables 212 can be adjusted in other conceivable embodiments, notably by using rack type cables.

The method of manufacturing and assembling an upper unit 7 comprises, according to the layout which has just been described, the following stages:
making of a lower part 71, comprising two lateral guiderails 711 linked via a cross member 37 bearing couplings 371 at its far ends;
assembling of this lower part 71 with a frame 3, notably by slotting the struts 35 into the couplings 371 of the cross member 37 and via the fixing of the guide rails 711 with the struts 35.

As previously indicated, this lower part 71 can be pre-equipped with means of motorization and driving, such as those previously indicated in the context of this embodiment. In this case, the mounting of the upper unit 7 comprises an assembling stage of the movable glass panel 1 with the feet 11 of the drive system.

The unit 7 being pre-assembled, the manufacturing of the door 200 is quickly and simply obtained by inserting the unit 7 into the body shell 6, between the external panel and the backing of the latter, and by interlocking the two elements by any appropriate means.

More precisely, the essential stages of the method according to the invention are:

a first stage, according to which body shell 6 of the door 200 is made, such a body shell 6 classically comprises an external panel, backing, different means of reinforcement, opening/closing systems;

a second stage, according to which an upper unit 7 of the door is made, such a upper unit 7 comprises a frame 3 of which at least one of the struts 34, 35 comprises means of guiding a movable panel 1, these struts 34, 35 being intended to enter the body shell 6 and to be fixed to it;

a third stage consisting of making the struts 34, 35 enter the upper unit 7 in the body shell 6 and of assembling by any appropriate means (screwing, welding, etc.) the struts to the interior of the body shell 6.

The order of the first two stages is given for information purposes only, these two stages being, in practice, carried out at the same time.

Figure 7:
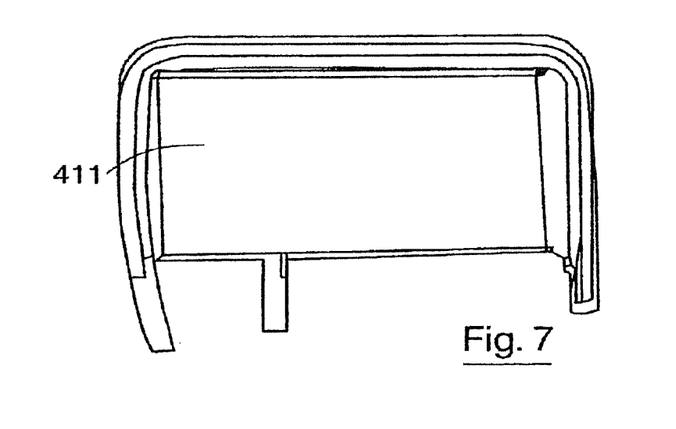
FIG. 7 is another view of the upper unit illustrated in FIG. 4, the blind being in the closed position.

Furthermore, according to an advantageous characteristic, the door 200 that has just been described can be fitted with a blind 41 comprising a movable toile 411 between a folded position (FIG. 4) and a spread out position (FIG. 7).

Blind 41 is sized in such a way so as to conceal the entire opening of the door 200 including the fixed rear quarter light window 4 (it can however be planned that, according to another conceivable embodiment, a specific blind be provided for the rear quarter light window 4).

Figure 4:
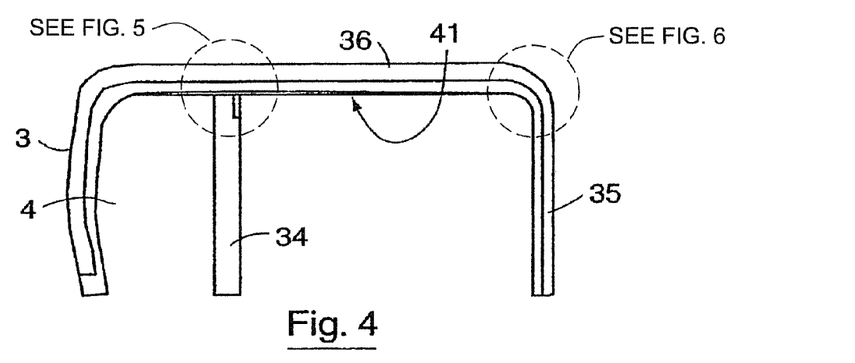
FIG. 4 is a view of an upper unit of the door according to the invention, fitted with a blind.
Figure 5:
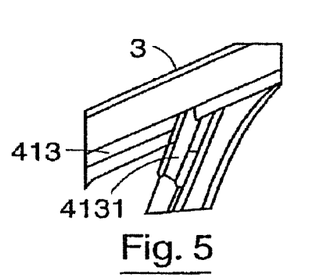
FIGS. 5 and 6 are detailed views of the assembly of a blind on an upper unit of the door according to the invention.
Figure 6:
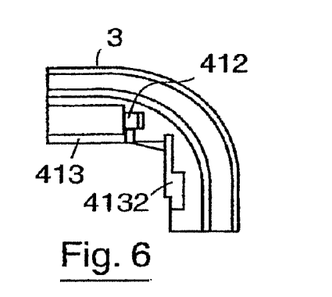

As illustrated by FIGS. 4 to 6, the winding tube 412 of the blind 41 is fitted to the upper part of the frame 3 (it is however conceivable, according to another embodiment, that the winding tube 412 is fitted to another part of the frame 3, in particular its lower part or one of the struts 34, 35).

In reference to FIGS. 5 and 6, the pull bar 413 bears the sliding feet 4131 and 4132, guided along the central strut 34 and the front strut 35 of the frame 3.

Figure 10:
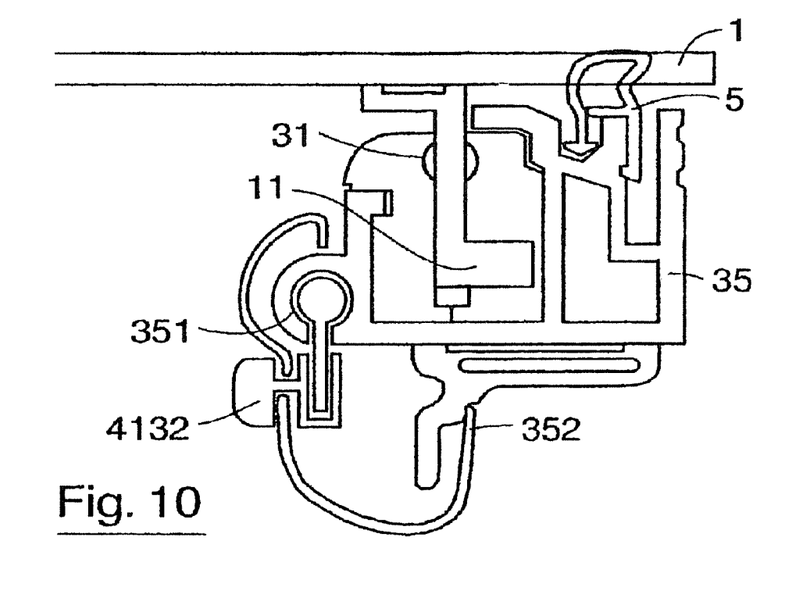
FIG. 10 is a cross-section view of the central strut and the front strut of the upper unit-illustrated in FIG. 4.

This aspect is illustrated in greater detail in FIGS. 9a, 9b and 10 which are respectively cross-section views of the central strut 34 and the front strut 35 of the frame 3.

As previously indicated, these struts 34, 35 integrate a guiding rail 31 planned to cooperate with the feet 11 interlocked with the movable panel 1 with the aim of guiding the sliding of the latter.

Trimmings 342 (FIGS. 9a, 9b) and 352 (FIG. 10) are added to the frame 3 with the aim of notably hiding the rails 341 (FIGS. 9a, 9b) and 351 (FIG. 10) and of hindering any dirt from entering.

In addition, the strut 34 has another guide rail 341 intended to cooperate with the foot 4131 (FIG. 5) (of which one end enters the rail 341) supported by a pull bar 413.

In a similar manner, the strut 35 has a rail 351 intended to cooperate with the foot 4132 (of which one end enters the rail 341) supported by a pull bar 413.

Figure 8:
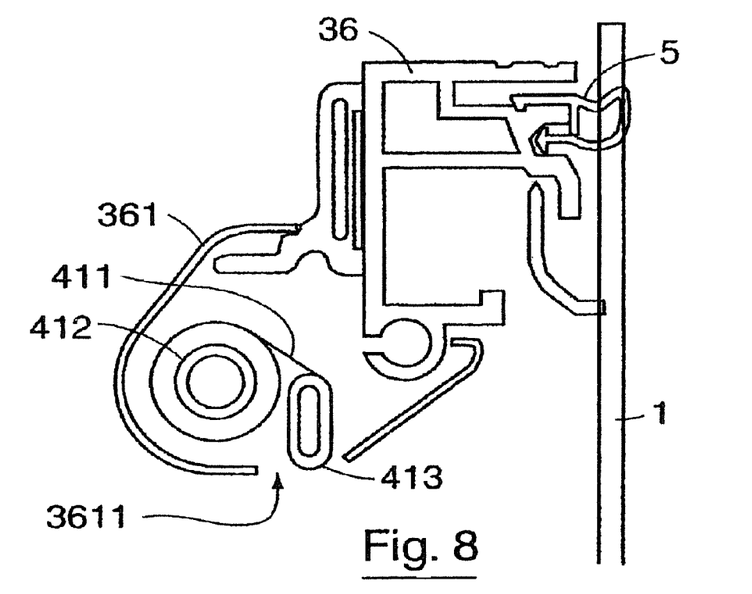
FIG. 8 is a cross-section view of the cross member illustrated in FIG. 4.

In reference to FIG. 8 which is a cross-section view of the cross member 36 of the frame 3, the winding tube 412 of the blind 41 is fitted next to the cross member 36.

Trimming 361, creating a box, is added to the cross member 36 so as to hide the winding tube 412 and to hinder any possible dirt from entering and affecting its proper working.

This trimming 361 has a slot 3611 so that the toile 411 of the blind can pass through, this slot 3611 being sized to allow the pull bar 413 to enter the interior of the trimming 361 in the folded position of the movable toile 411.

According to this embodiment, the struts 34 and 35 of the cross member 36 are attached to the watertight seal 5 intended to ensure the watertightness of the sealing device when the movable panel 1 is in the sealing position 202.

Furthermore, the door 200 comprises, according to another advantageous aspect, burglarproof means acting upon the movable panel 1 when the latter is in the sealing position 202.

Figure 11:
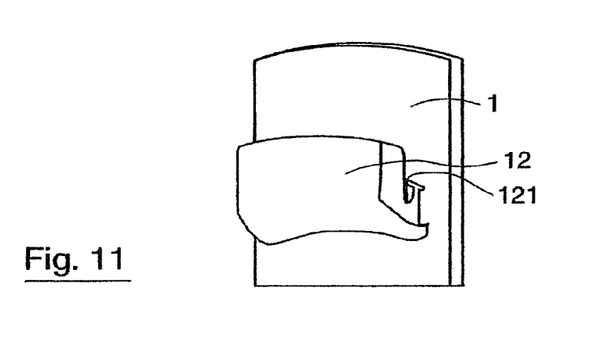
FIGS. 11 and 12 are views of the means of locking/unlocking the movable panel of a door according to the invention.
Figure 12:
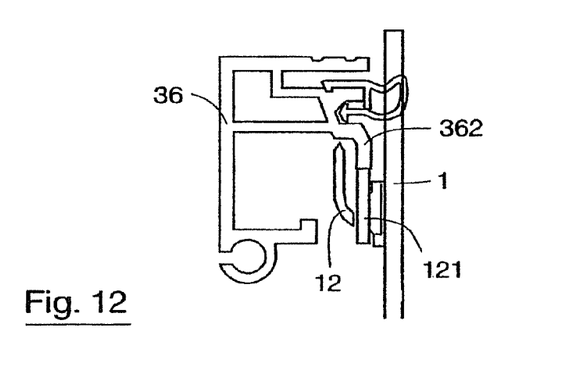

This aspect is illustrated by FIGS. 11 and 12.

In reference to FIG. 11, these burglarproof means are comprised of a lock 12, made for example in metal covered in a TPE type material, fixed to the side of the movable panel 1 turned towards the inside of the vehicle. Several locks can of course to planned for.

As illustrated in FIG. 12, a lock is intended, in the sealing position 202 of the movable panel 1, to be embedded into the housing 362 of the frame 3 defined by the part 362 protruding into the cross member 36.

Thus, once the movable panel 1 is in the sealing position 202, it is impossible for someone to pull on the movable panel 1 so as to displace it towards the exterior of the vehicle, nor to lean down on it to displace it towards the interior.

Advantageously, a screw 121 goes through the lock 12 and is intended to cooperate with the part 362 of the cross member with the aim of, during the tightening or loosening of the screw 121, adjusting the sealing position 202 of the movable panel 1.

To be specific, this screw 121 acts so as to adjust the sealing position 202 of the movable panel 1 in an upward direction. Another screw operating with another part of the frame 3 can also be planned so as to adjust the sealing position 202 of the movable panel 1 in a lateral direction.

Figure 13A:
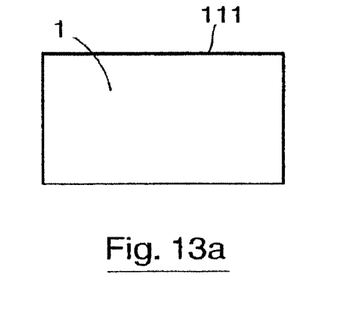
FIGS. 13a and 13b are views of two movable panels, respectively in the rectangular and trapezoidal shape, allowing to illustrate the position of the means of locking/unlocking.
Figure 13B:
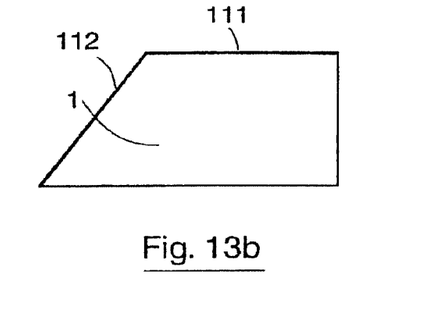

The lock 12 that has just been described can be fitted to the upper edge 111 of the movable panel 1, in particular if the latter has a rectangular shape (FIG. 13a), or to its upper edge 111 and/or its sloping edge 112, in the case of a movable panel of trapezoidal shape (FIG. 13b).

In the case of a trapezoidal shaped panel, adjustment screws associated with a lock fitted next to the upper edge 111 of a part, and a lock fitted next to the sloping edge 112, allow the adjusting of the sealing position 202 of the movable panel as much in an upward direction as a lateral direction.

As previously indicated, the principle of the invention particularly applies to side doors, and also applies to back doors and rear hatches. Also, according to a variant, the doors (or rear hatches), according to the invention, can be fitted with a linear windscreen wiper device.

Figure 14:
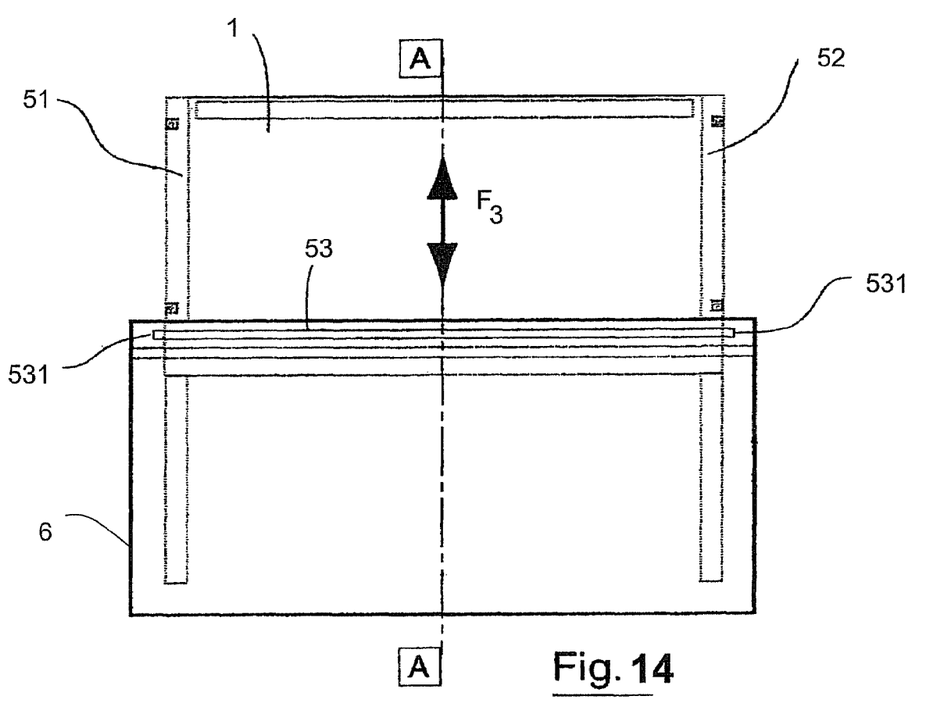
FIG. 14 is a front elevation of a rear hatch according to the principle of the invention, pre-equipped with a windscreen wiper device.

Such an embodiment is illustrated in FIG. 14.

As shown in this figure, the struts 34, 35 of the door 200 integrate the means of guiding allowing linear displacement, according to a substantially vertical direction (such as indicated by the double arrow F3), the blade 50 having the aim of evacuating the water present on the window 1 (according to another conceivable embodiment, the means of guiding can be planned to ensure a linear displacement according to a substantially horizontal direction).

These means of guiding are composed of a rail in which the feet supported by the blades are likely to be displaced. This rail comprises:

two runners extending substantially along the entire height of the window 1, parallel to each other;

two offset tracks parallel between them and linking the two runners, whilst sloping in relation to the latter.

Such a guide rail enables an operating cycle according to which the windscreen wiper is slid across the surface of the window, and then distanced from it, slid in the opposite direction along the window (whilst being distanced from it), then brought into contact with the window, before being slid once again across the latter.

Although the present invention has been described with reference to preferred embodiments, workers skilled in the art will recognize that changes may be made in form and detail without departing from the spirit and scope of the invention.

What is claimed is:

1. A door of a motor vehicle comprising a body shell and at least one movable glass panel arranged to slide at least partially on an inside of the body shell between a sealing position and at least one sliding position, wherein:
the door comprises at least one strut bearing a watertight seal against which an inside of the movable glass panel presses in the sealing position, and wherein:
at least one guide track supported on the at least one strut, said at least one guide track configured to:
move the movable glass panel toward the outside of the motor vehicle in a sliding position, when the movable glass panel slides from said sealing position into said sliding position, the movable glass panel sliding separated from the watertight seal in the sliding position so that the movable glass panel does not have contact with the watertight seal in said sliding position and so that the movable glass panel slides without damaging the watertight seal;
guide the movable glass panel, when the movable glass panel slides from said sliding position into said sealing position, to return to press against the watertight seal in the sealing position and the at least one strut is connected at un upper part by a cross member to form an interior frame and framed opening, the watertight seal substantially extending along the entire length of three sides of the framed opening.

2. A door according to claim 1, wherein, in the sliding position, the movable glass panel is in a sliding plane parallel to a sealing plane occupied by the glass panel in the sealing position.

3. A door according to claim 1, wherein the door comprises at least two guide tracks, and the at least two guide tracks are supported on the at least one strut, respectively next to upper and lower parts of the movable glass panel.

4. A door according to claim 1, wherein the at least one strut is mounted within the body shell.

5. A door according to claim 1, wherein the at least one strut is arranged to contact with a side of the movable glass panel that is turned toward an inside of the motor vehicle, so as to have a flush aspect when the movable glass panel is in the sealing position.

6. A door according to claim 1, wherein the movable glass panel is mounted to at least one shoe whose displacement is guided via a guide rail and the at least one guide track.

7. A door according to claim 6, comprising a motorized means of driving the movable glass panel that act on the at least one shoe, ensuring the sliding.

8. A door according to claim 1, comprising a motorized means of driving the movable glass panel, ensuring the sliding.

9. A door according to claim 8, wherein the means of driving are mounted onto a single rail fitted to at least one of the inside of the body shell, and at least one of the struts.

10. A door according to claim 8, wherein the means of driving are mounted onto a single rail fitted to at least one of the inside of the body shell, or the at least one strut.

11. A door according to claim 1, wherein the door further comprises at least one fixed panel, fitted adjacent to a sealing plane occupied by the movable glass panel in the sealing position.

12. A door according to claim 1, wherein the door comprises at least one windscreen wiper blade that moves across the movable glass panel when the movable glass panel is in the sealing position, and means of guiding the at least one windscreen wiper blade on the at least one strut as to allow for movement of the at least one windscreen wiper blade.

13. A door according to claim 1, wherein the door has a blind.

14. A door according to claim 13, wherein the blind comprises a pull bar, and the door comprising at least one shoe attached to the pull bar, and the shoe slides along the at least one strut for moving the blind between a rolled position and a spread out position.

15. A door according to claim 1, wherein the door comprises burglarproof means acting upon the movable glass panel in the sealing position.

16. A door according to claim 15, wherein the burglarproof means comprise at least one lock intended to operate with a complementarily shaped housing set into the struts or into the frame, providing a burglarproof position of the glass panel in the sealing position, according to which the glass panel cannot be pulled towards the exterior of the vehicle.

17. A door according to claim 16, wherein the at least one lock is arranged to slot into a part that protrudes from the strut or the frame.

18. A door according to claim 1, wherein the door comprises means of adjusting the sealing position of the movable glass panel.

19. A door according to claim 18, wherein the means of adjusting are supported by at least a portion of the movable glass panel, and cooperate with the frame so as to adjust the sealing position of the movable glass panel.

20. A door according to claim 19, wherein the means of adjusting comprise two screws, one acting on the movable glass panel to adjust its sealing position along the width of the movable glass panel, the other acting on the movable glass panel to adjust the sealing position along the height of the movable panel.

21. A door according to claim 1, wherein the at least one strut is made by extrusion.

22. A unit of a door for a motor vehicle, the unit ready to be mounted to a lower shell of the door, and comprising at least one movable glass panel arranged to slide at least partially on an inside of the lower shell between a sealing position and at least one sliding position, wherein:
the unit comprises at least one strut bearing a watertight seal against which an inside of the movable glass panel presses in the sealing position, and wherein
the at least one strut supports at least one guide track, said at least one guide track configured to:
move the movable glass panel toward the outside of the motor vehicle in a sliding position, when the movable glass panel slides from said sealing position into said sliding position, the movable glass panel sliding separated from the watertight seal in the sliding position so that the movable glass panel does not have contact with the watertight seal in the sliding position and so that the movable glass panel slides without damaging the watertight seal, and
guide the movable glass panel, when the movable glass panel slides from said sliding position into said sealing position, to return to press against the watertight seal in the sealing position, and the at least one strut is connected at un upper part by a cross member to form an interior frame and framed opening, the watertight seal substantially extending along the entire length of three sides of the framed opening.

23. A unit according to claim 22, wherein the door also comprises means of motorization for moving the movable glass panel.

24. A unit according to claim 23, wherein the means of motorization are fitted to a lower cross member linking the lower shell to the at least one strut.

25. A unit according to claim 23, wherein the means of motorization comprises:
- at least one gear motor,
- at least one coil coupled to the gear motor,
- at least one multi-stranded cable,
- at least one protective sheath of the cable, and means of placing the cable under tension.

26. A unit according to claim 22, wherein the at least one strut has an extension intended to enter the lower shell so as to allow the interlocking of the lower shell with the unit.

27. A unit according to claim 22, wherein the unit comprises means of stiffening for stiffening the at least one strut.

28. A unit according to claim 27, wherein the means of stiffening comprise at least one lower cross member linking the lower shell to the at least one strut.

29. A unit according to claim 28, wherein the lower cross member has a coupling that provides support of the at least one strut.

30. A unit according to claim 29, wherein the coupling comprises a housing for the at least one strut.

31. A unit of the door according to claim 30, wherein the at least one guide track has at least one mounting bracket on one of the at least one strut and the lower cross member.

32. A unit of the door according to claim 30, wherein the at least one guide track has at least one mounting bracket on one of the at least one strut or the lower cross member.

33. The unit according to claim 22, comprising a blind.

34. A motor vehicle, wherein at least one door of the motor vehicle comprises a body shell and at least one movable glass panel arranged to slide at least partially on an inside of the body shell between a sealing position and at least one sliding position, wherein:
- at least one strut bears a watertight seal against which an inside of the movable glass panel presses in the sealing position, and wherein
- the at least one strut supports at least one guide track, said at least one guide track configured to:
  - move the movable glass panel toward the outside of the motor vehicle in a sliding position, when the movable glass panel slides from said sealing position into said sliding position, the movable glass panel sliding separated from the watertight seal in the sliding position so that the movable glass panel does not have contact with the watertight seal in this sliding position and so that the movable glass panel slides without damaging the watertight seal,
  - guide the movable glass panel, when the movable glass panel slides from said sliding position into said sealing position, to return to press against the watertight seal in the sealing position and the at least one strut is connected at un upper part by a cross member to form an interior frame and framed opening, the watertight seal substantially extending along the entire length of three sides of the framed opening.

* * * * *

UNITED STATES PATENT AND TRADEMARK OFFICE
CERTIFICATE OF CORRECTION

PATENT NO.        : 7,624,537 B2                                          Page 1 of 1
APPLICATION NO.   : 10/719977
DATED             : December 1, 2009
INVENTOR(S)       : Stephane Moreau It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Twenty-sixth Day of October, 2010

David J. Kappos
*Director of the United States Patent and Trademark Office*